United States Patent [19]

Okabe et al.

[11] Patent Number: 4,697,503
[45] Date of Patent: Oct. 6, 1987

[54] DRIP DRINK MAKER

[75] Inventors: Ryuichiro Okabe, Tokyo; Yoshitaka Yanagi, Tanashi, both of Japan

[73] Assignee: Ajinomoto General Foods, Tokyo, Japan

[21] Appl. No.: 825,411

[22] Filed: Feb. 3, 1986

[30] Foreign Application Priority Data

Feb. 5, 1985 [JP] Japan .................................. 60-15114

[51] Int. Cl.⁴ .............................................. A47J 31/02
[52] U.S. Cl. .......................................... 99/306; 426/82
[58] Field of Search ................. 99/295, 306, 300, 279, 99/323, 304, 299; 426/77, 82, 433

[56] References Cited

U.S. PATENT DOCUMENTS

| | | | |
|---|---|---|---|
| 3,139,344 | 6/1964 | Weisman | 99/295 |
| 3,446,624 | 5/1969 | Luedtke | 99/295 |
| 3,937,134 | 2/1976 | Molenaar | 426/82 |
| 4,069,751 | 1/1978 | Gronwick | 99/306 |
| 4,080,299 | 3/1978 | Bartolome | 99/295 |
| 4,167,136 | 9/1979 | Chupurdy | 99/306 |

Primary Examiner—Robert W. Jenkins
Attorney, Agent, or Firm—Linn I. Grim; Daniel J. Donovan

[57] ABSTRACT

An improved drip maker is provided which comprises a cup-shaped receiver containing, as the bottom surface, a drip wall, with apertures and having a hemisphere-shape protruding toward the opening of the receiver, forming a drip space between the drip wall and pack of drippable coffee or tea components positioned on the drip wall.

3 Claims, 5 Drawing Figures

DRIP DRINK MAKER

FIELD OF UTILIZATION IN INDUSTRY

This device relates to the improvement of the drip drink maker.

CONVENTIONAL ART AND ITS PROBLEM

A drip drink maker for extracting coffee or the like from a pack which contains and seals therein powder of coffee beans or tea leaves or the like, is generally known.

The drip drink maker of this kind heretofore had, as illustrated in, for example, Utility Model Public Disclosure No. 3184/1978, a structure of placing a pack which contains and seals therein powder of coffee beans or the like, on a horizontal bottom surface of a container to permit coffee or the like to drip down from aperture or apertures which are disposed in the said bottom surface.

The prior art, however, had a defect of the pack closing the apertures due to the fact that the bottom surface is horizontal and dripping is not carried out smoothly.

The objective of present device is to provide a practically useful drip drink maker which improves the above mentioned defect of the conventional technic.

MEANS TO SOLVE THE PROBLEM

In order to solve the above mentioned problem of the prior art, the subject device provides the bottom part of the cup-shaped receiver with a drip space in order to carry out the dripping effectively.

10 . . . Receiver
11 . . . Pack
12 . . . Holding shoulder
13 . . . Bottom wall
20 . . . Holder
21 . . . Cylindrical portion
40 . . . Drip wall
60 . . . Grooved apertures

EMBODIMENT

An embodiment of the subject device is hereinafter explained in detail by making reference to the drawings.

Figure 1:
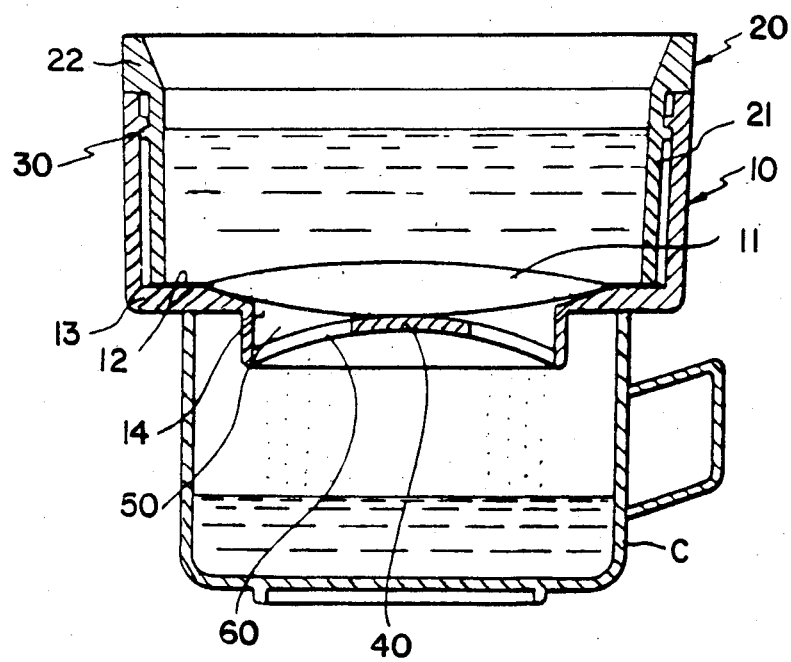
FIG. 1 is a cross-sectional figure illustrating the drip drink maker covered by the subject device, when in use.

Referring to FIG. 1, it illustrates a drip drink maker covered by the subject device and the drip drink maker has a cup-shaped receiver 10. The receiver is placed on a cup C when in use. The receiver has a bottom wall 13 which forms a holding shoulder 12 on which a pack 11 is placed. The pack 11 is in a normal shape formed by sealing powder of coffee beans or green tea leaves or the like in filter paper. The inner diameter of the receiver is big enough so that the pack 11 can be inserted smoothly.

An indented portion 14 is formed in the center part of the bottom wall 13. Accordingly, the periphery of the pack 11 is placed on the holding shoulder 12.

Figure 5:
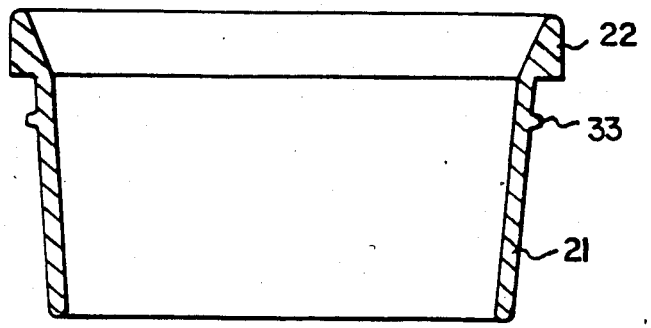
FIG. 5 is a cross-section figure of FIG. 4.

The holder 20 is inserted into the receiver 10. The holder is as illustrated in FIG. 1 and FIG. 5, formed by a hollow cylindrical body 21 which smoothly fits into the receiver and a top portion 22 is formed on the upper end of the cylindrical portion. A bottom edge of the cylindrical portion 21 holds the periphery of the pack 11 with the holding shoulder 12 of the receiver.

Between the receiver and the holder, a fixing means which fixes the holder into the reciever in freely attachable or detachable conditions, is provided. This fixing means comprises, in the illustrated embodiment, a projecting body 31 in plural number which is formed on the inner surface of the reciever and a cam surface 32 which is formed on the projecting bodies, and a protrusion 33 in plural number which is formed on the outer periphery of the holder, which engages with the cam surface in freely attachable or detachable conditions (cf. FIG. 2 through FIG. 4). By revolving the holder, the protrusion 33 engages with or disengages from the cam surface 32 of the projecting body.

Figure 4:
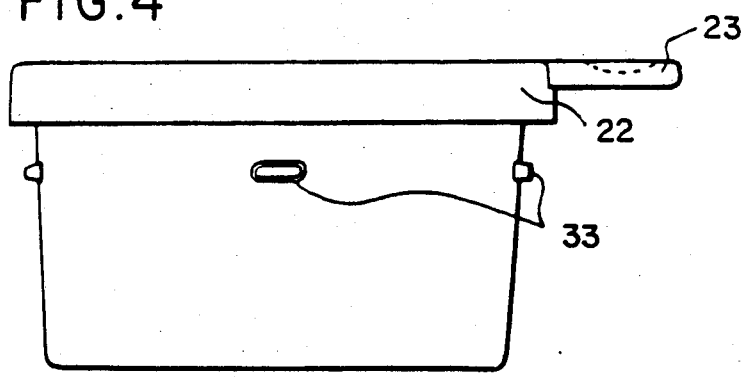
FIG. 4 is a side figure of the holder.

Moreover, a handle 23 is provided on the top portion 22 of the holder to hold the holder by hand (cf. FIG. 4).

Figure 2:
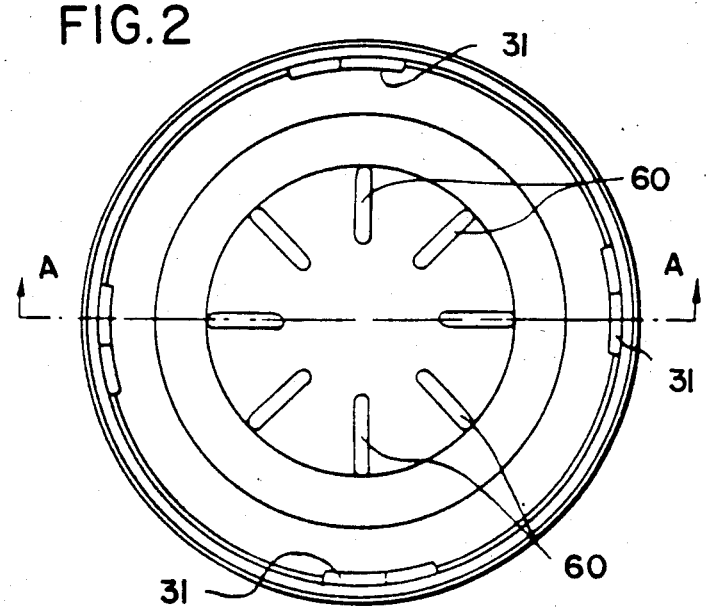
FIG. 2 is a plane figure of the receiver.
Figure 3:
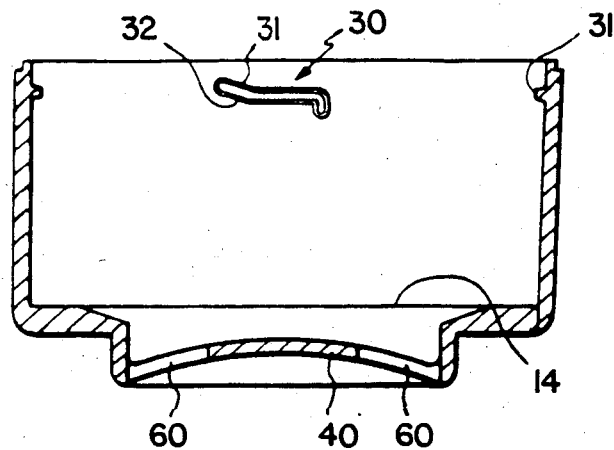
FIG. 3 is a cross-section figure of A—A line in FIG. 2.

The receiver 10 is provided with a drip wall 40 at a position below the bottom wall 13 (cf. FIG. 1 and FIG. 2). The drip wall is protruding in a form of a hemisphere toward the holding shoulder 12 in the illustrated embodiment. Hence, the center part of the pack 11 is supported as illustrated in FIG. 1 by its top part. Accordingly, between a greater part of the pack from its center part to periphery and a greater part of the drip wall 40 from its center part to periphery, a drip space 50 is formed.

Also, the receiver has grooved apertures 60 in plural number disposed and extended radically on circumferential of the drip wall. These grooved apertures function as a passage of extracted liquid at the time when extracted liquid from the pack 11 to drip down into the cup C. In such case, the pack 11 does not close the grooved apertures because of the drip space 50 so that the dripping is carried out smoothly. Moreover, H in FIG. 1 indicates hot water.

According to this device, there is actual usefulness that the dripping function is surely and smoothly carried out as a result of providing a space between the pack and the grooved apertures for dripping so as to keep the pack from closing the grooved apertures. There is also an advantageous point that the dripping can be performed rapidly by the long and slender grooved apertures.

Moreover, in the above embodiment, the drip wall is formed in a hemisphere in order to keep a space between the pack and grooved apertures, but the subject device is not limited to this embodiment. For example, the drip wall may be formed horizontally and by providing a protruding rib on it to support the pack with the protruding rib. In summary, any means which keeps space between the pack and the grooved apertures would be suffice.

Also, in the above embodiment, the grooved apertures in plural number were used as apertures for dripping, but a round apertures in plural number would also be suffice, so that it is not limited to the above mentioned embodiment.

What is claimed is:

1. A drip drink maker comprising a cup-shaped receiver containing a drip wall as the bottom surface of said cup-shaped receiver, said drip wall containing a plurality of apertures and present in the shape of a hemisphere protruding toward the upper opening of said cup-shaped receiver, a pack containing drippable coffee or tea components positioned on said drip wall to form a drip space between said pack and the greater part of said drip wall and a unit into which said cup-shaped receiver will fit providing a space to hold a liquid which drips from said cup-shaped receiver.

2. The drip drink maker of claim 1 wherein the apertures are long and slender grooved openings being disposed radially on circumferential of said drip wall.

3. The drip drink maker of claim 1 wherein the cup-shaped receiver contains a holder formed by a hollow cylindrical body which smoothly fits into said receiver, said body at the upper end of said receiver forms a cyclindrical portion and the bottom edge of said cylindrical portion holds the periphery of said pack containing drippable coffee or tea components.

* * * * *